(12) United States Patent
Johnson

(10) Patent No.: US 6,634,027 B1
(45) Date of Patent: Oct. 14, 2003

(54) COMMUNICATIONS CIRCUITRY FOR COMBINING TERRESTRIAL AND SATELLITE SIGNALS

(75) Inventor: Harold W. Johnson, Roach, MO (US)

(73) Assignee: Sprint Communications Company L.P., Overland Park, KS (US)

( * ) Notice: Subject to any disclaimer, the term of this patent is extended or adjusted under 35 U.S.C. 154(b) by 0 days.

(21) Appl. No.: 09/293,465

(22) Filed: Apr. 15, 1999

(51) Int. Cl.[7] .................................................. H04N 7/20
(52) U.S. Cl. ........................... 725/67; 725/68; 725/73; 725/63; 455/3.02; 455/427
(58) Field of Search ............................... 725/48, 59, 63, 725/70, 71, 73, 78, 80, 82, 106, 109, 144, 146, 147, 138, 114, 116, 117, 67, 68; 348/723, 724, 469; 455/3.01, 3.02, 12.1, 427

(56) References Cited

U.S. PATENT DOCUMENTS

| | | | | |
|---|---|---|---|---|
| 5,027,426 A | * | 6/1991 | Chiocca, Jr. | 379/90.01 |
| 5,387,943 A | * | 2/1995 | Silver | 348/512 |
| 5,483,663 A | * | 1/1996 | Tawil | 455/180.1 |
| 5,550,576 A | * | 8/1996 | Klosterman | 348/906 |
| 5,756,280 A | * | 5/1998 | Soora et al. | 725/116 |
| 5,857,142 A | * | 1/1999 | Lin et al. | 725/109 |
| 5,898,455 A | * | 4/1999 | Barakat et al. | 455/180.1 |
| 5,903,734 A | * | 5/1999 | Chida | 709/231 |
| 5,926,547 A | * | 7/1999 | Heieis et al. | 380/210 |
| 5,999,137 A | * | 12/1999 | Crosby | 343/725 |
| 6,032,057 A | * | 2/2000 | Kiiski | 455/562 |
| 6,104,908 A | * | 8/2000 | Schaffner et al. | 725/78 |
| 6,240,556 B1 | * | 5/2001 | Evans et al. | 725/114 |
| 6,304,578 B1 | * | 10/2001 | Fluss | 370/413 |
| 6,381,745 B1 | * | 4/2002 | Paul | 725/69 |
| 6,389,593 B1 | * | 5/2002 | Yamagishi | 725/9 |
| 6,424,661 B1 | * | 7/2002 | Bentley | 370/482 |
| 6,430,742 B1 | * | 8/2002 | Chanteau | 333/100 |
| 6,473,900 B1 | * | 10/2002 | Pham et al. | 725/63 |
| 6,486,907 B1 | * | 11/2002 | Farber et al. | 725/78 |
| 6,493,873 B1 | * | 12/2002 | Williams | 725/78 |

OTHER PUBLICATIONS

Staal et al., Apparatus for, and Method of, Receiving Satellite Television Signals in an Apartment Building and Providing Television Images in the Receivers in such Building, Mar. 28, 2002, US 2002/0038458 A1.*

Stiles, Methods and Apparatus for Multipoint Hierarchical Redistribution of Multimedia Content, Jun. 6, 2002, US 2002/0069416 A1.*

Dillon, Satellite Broadcasting System Employing Channel Switching, Aug. 8, 2002, US 2002/0108116 A1.*

* cited by examiner

Primary Examiner—Chris Grant
Assistant Examiner—Jason Chung

(57) ABSTRACT

Communications circuitry comprising integration circuitry coupled to interface circuitry. The integration circuitry is configured to convert at least a portion of a terrestrial signal into a satellite channel frequency and to combine the converted terrestrial signal and a satellite signal into an integrated digital signal. The converted terrestrial signal occupies at least one unoccupied channel in the satellite signal. The interface circuitry is configured to provide the terrestrial signal and the satellite signal to the integration circuitry and to transmit the integrated digital signal.

23 Claims, 5 Drawing Sheets

COMMUNICATIONS CIRCUITRY FOR COMBINING TERRESTRIAL AND SATELLITE SIGNALS

BACKGROUND OF THE INVENTION

1. Field of the Invention

The invention relates to communications circuitry, and particularly to communications circuitry for combining a terrestrial signal and a satellite signal into an integrated digital signal for delivery to users.

2. Description of the Prior Art

Communication systems provide various broadband services such as telephone, television, and Internet to subscriber's homes. These services are typically provided by either an exchange of a satellite signal with a satellite system, or an exchange of a terrestrial signal with a terrestrial communications system.

Satellite systems are well suited for broadcast services, such as audio and video programming, but are not well suited for mass full duplex communications like voice telephony and two-way data services. Satellite systems suffer from problems, such as latency or delay of signal transmission, that effect the quality of service necessary for telephony and real time data services. Terrestrial communications systems on the other hand, are designed for full duplex communications offering little or no delay for services such as voice telephony, data streaming multimedia, and other real time sensitive communications.

One example of a satellite system is a Direct Broadcast Satellite (DBS) system illustrated in FIG. 1. DBS is a digital satellite system that broadcasts television signals received by a relatively small and inexpensive satellite dish antenna typically mounted on either the roof or side of a house. DBS transmissions have enormous capacity, with each satellite having 16 transponders that operate in the KU-band spectrum at fairly high power levels. Using data compression and multiplexing, a pair of satellites working together have the potential to provide over 150 conventional non-high definition television video and audio channels via 32 transponders.

The KU band is the portion of the electromagnetic spectrum in the 12 Ghz to 14 Ghz range. DBS satellites typically employ 14 Ghz on the uplink to the satellite and 12.2 to 12.7 Ghz on the downlink to the dish antennas. The dish antennas receive DBS signals containing original picture and sound information and provide those signals to a DBS receiver connected to the subscriber's television. A low-noise block converter (LNB) converts the 12.2 to 12.7 Ghz downlink signal from the DBS satellite into a 950 to 1450 Mhz signal required by the DBS receiver. A tuner in the DBS receiver isolates a single digitally modulated 24 Mhz transponder, while a demodulator converts the modulated data into a digital data signal for output over the subscriber's television.

Two types of LNBs are available: dual and single output. Single-output LNBs have one radio frequency (RF) connector while dual-output LNBs have two. The dual-output LNB can be used to feed a second receiver or other form of distribution system. Both types of LNBs can receive both left and right-hand polarized signals. Polarization is selected electrically with a direct current (DC) voltage fed onto the center connector and shield of the coax cable from the receiver. The right-hand polarization mode is selected with +13 volts while the left-hand polarization mode is selected with +17 volts.

Audio and video signals from the program provider are encoded and converted to data packets. The configurations can vary, depending on the type of programming. The data packets are then multiplexed into serial data and sent to a transmitter. To minimize the data-transfer rate, the data is compressed using Motion Picture Expert Group (MPEG2), a specification for transportation of moving images over communication data networks. Compression is accomplished by predicting motion that occurs from one frame of video to another and transmitting motion data and background information. By coding only the motion and background difference, instead of the entire frame of video information, the effective video data rate can be reduced from hundreds of Mbps to an average of 3 to 6 Mbps. This data rate is dynamic and will change, depending on the amount of motion occurring in the video picture.

In addition to MPEG video compression, MPEG audio compression is also used to reduce the audio data rate. Audio compression is accomplished by eliminating soft sounds that are near the loud sounds in the frequency domain. The compressed audio data rate can vary from 56 Kbps on mono signals to 384 Kbps on stereo signals.

To prevent unauthorized signal reception the video signal is encrypted or scrambled at the uplink site. A secure encryption "algorithm" Digital Encryption Standard (DES) is used to encode the video information. The keys for decoding the data are transmitted in the data packets. A customer Access Card decrypts the keys, which allows the receiver to decode the data.

Referring to FIG. 2, the video program information is completely digital and is transmitted in data "packets." Examples of data packets are Video, Audio, Conditional Access (CA), compatible serial data, and Program Guide. The video and audio packets contain the visual and audio information of the program. The CA packet contains information that is addressed to each individual receiver. This includes customer e-mail, Access Card activation information, and which channels the receiver is authorized to decode. The Program Guide maps the channel numbers to transponders and also gives television program listing information.

Each data packet contains 147 bytes. The first two bytes of information are contained in the Service Channel ID (SCID). The SCID is a unique 12-bit number from 0 to 4095 that uniquely identifies the packet's data channel. The Flags consist of 4-bit numbers, used primarily to control whether or not the packet is encrypted and which key to use. The third byte of information is made up of a 4-bit Packet-Type indicator and a 4-bit Continuity Counter. The Packet Type identifies the packet as one of four data types. When combined with the SCID, the Packet Type determines how the packet is to be used. The Continuity Counter increments once for each Packet Type and SCID. The next 127 bytes of information consists of the "payload" data, which is the actual usable information sent from the program provider.

Unfortunately, DBS systems only provide national television programming and not local television programming. Local programming reception requires switching to a conventional antenna and use of a different infrared remote controller. When local programming is desired, the user operates a switch in the receiver to invoke connection of the outside antenna for local broadcast reception.

Terrestrial communications systems on the other hand, provide a wide range of services including local television programming and real time full duplex communications. Terrestrial communications systems are increasing in bandwidth through technologies such as asymmetrical digital subscriber lines (ADSL), very high speed subscriber lines (VDSL), Cable Modems and Broadband Wireless Systems. These systems employ physical wireline and wireless transmission mediums, such as twisted pair, fiber, coax, microwave, free space laser, and use transport layer and service layer protocols such as Asynchronous Transfer Multiplexing (ATM), Transmission Control Protocol/Internet Protocol (TCP/IP), and Time Division Multiplexing/Time Division Multiple Access (TDM/TDMA).

Some examples of terrestrial communications systems include but are not limited to, broadband wireless systems which operate at microwave frequencies of 1 Ghz–38 Ghz, VDSL systems, ADSL systems, and optical systems which operate at wavelengths such as 1550 NM. One example of terrestrial broadband wireless system is a microwave multipoint distribution service (MMDS) system. MMDS was originally an alternative to cable-based cable television, but is now authorized for two-way or one-way communications of telephony voice, data, and video. MMDS can also carry signals compatible with a DBS system having similar compression, digital packet format, data encryption, synchronization, programming authorization and billing processes. The microwaves employed by the MMDS band are electromagnetic waves in the radio frequency spectrum between 2.15 to 2.162 Ghz and between 2.5 to 2.690 Ghz.

SUMMARY OF THE INVENTION

The present invention advances the art by providing communications circuitry that integrates a satellite signal and a terrestrial signal to optimize the ability of user devices to process these signals. Integration of satellite signals and terrestrial signals also provides enhanced service offerings. Broadband terrestrial network properties, such as full-duplex, high speed, low latency, and high capacity, complement the broadcast program capacity of satellite systems. Integration of broadband terrestrial networks and satellite systems enables a robust and broad array of telephony, data, national and local broadcast, as well as on demand video programming.

The present communications circuitry comprises integration circuitry coupled to interface circuitry. The integration circuitry is configured to convert at least a portion of a terrestrial signal into a satellite channel frequency and to combine the converted terrestrial signal and a satellite signal into an integrated digital signal. The terrestrial signal occupies at least one unoccupied channel in the satellite signal. The interface circuitry is configured to provide the terrestrial signal and the satellite signal to the integration circuitry and to transmit the integrated digital signal.

DETAILED DESCRIPTION OF THE PREFERRED EMBODIMENT

Figure 1:
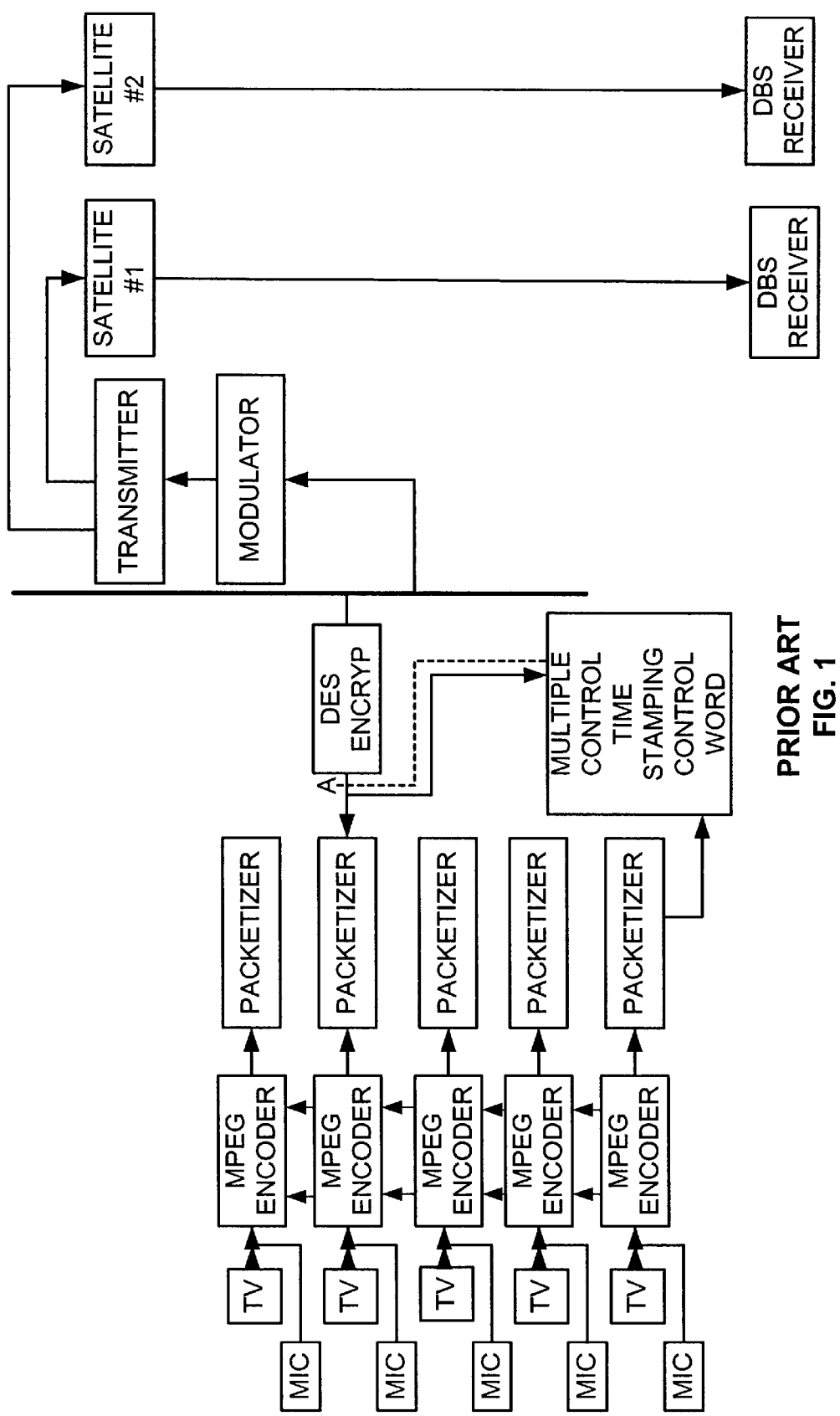
FIG. 1, illustrates an example of a direct broadcast satellite system.
Figure 2:
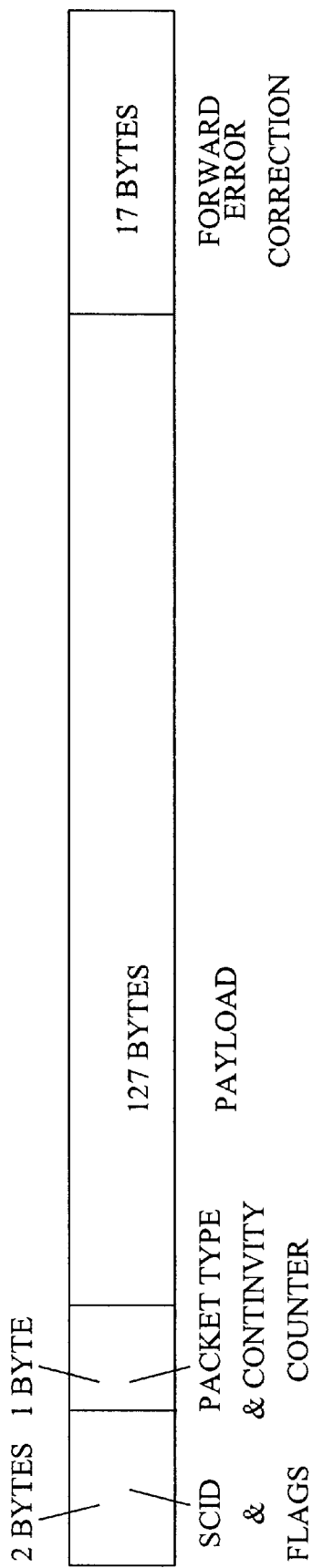
FIG. 2, illustrates an example of a direct broadcast satellite system data packet format.
Figure 3:
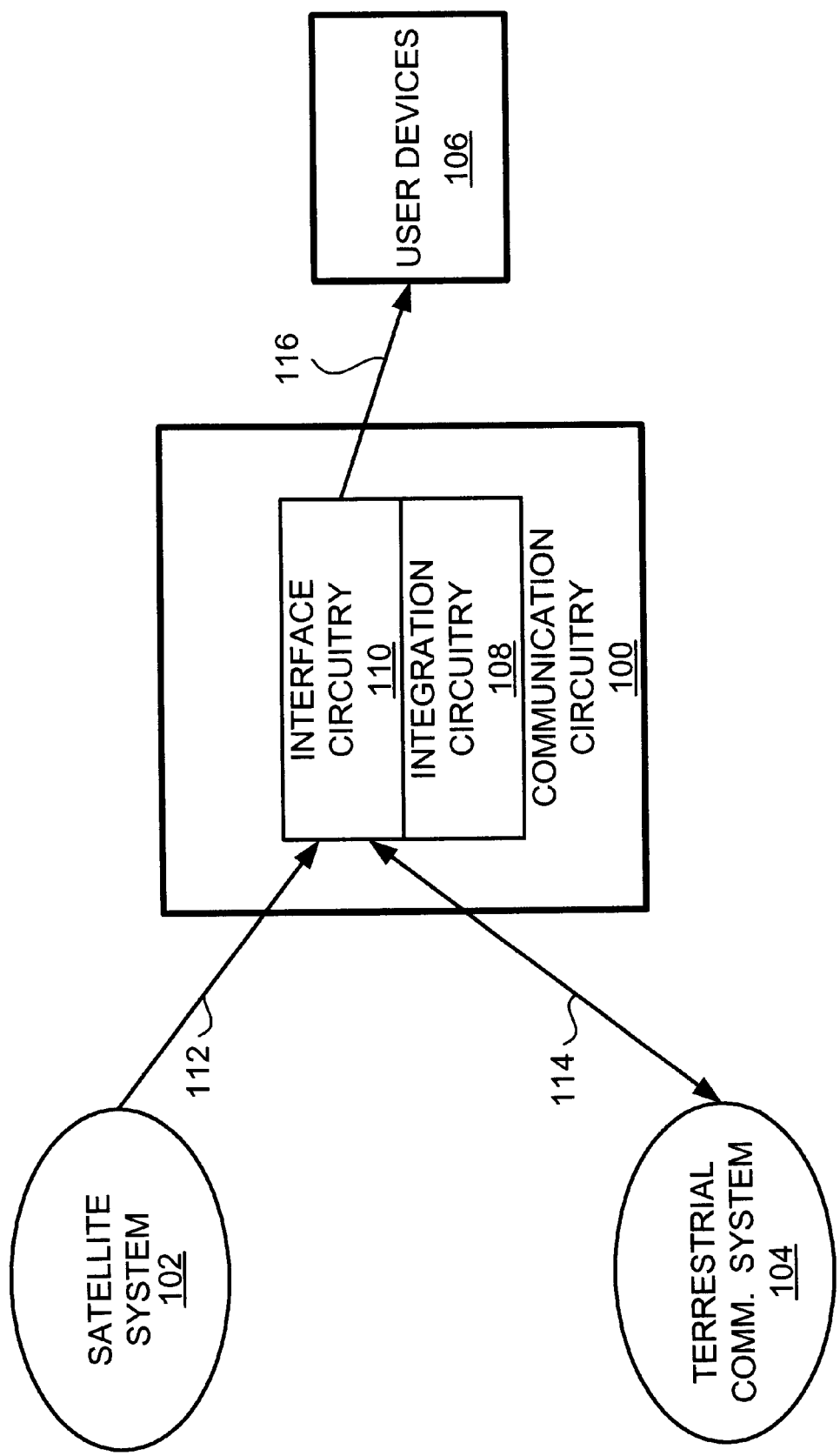
FIG. 3, illustrates a system configuration in an example of the invention.

FIG. 3 depicts communications circuitry 100, satellite system 102, satellite signal 112, terrestrial communications system 104, terrestrial signal 114, and user devices 106. Communications circuitry 100 is connected to user devices 106. User devices 106 could be any user devices capable of connecting to communications circuitry 100. Some examples of user devices 106 include but are not limited to, video equipment, audio equipment, and computer equipment. Terrestrial communications system 104 could be any terrestrial system capable of providing a ground to ground wireless signal or wireline signal. Some examples of terrestrial communications system 104 include but are not limited to, an MMDS system, an ADSL system, and a VDSL system. Satellite system 102 could be any satellite system capable of providing a satellite to ground signal, where a satellite is defined as a device orbiting the earth.

Communications circuitry 100 comprises interface circuitry 110 coupled to integration circuitry 108. In operation, interface circuitry 110 receives satellite signal 112 from satellite system 102 and exchanges terrestrial signal 114 with terrestrial communications system 104. Interface circuitry 110 provides satellite signal 112 and terrestrial signal 114 to integration circuitry 108. Integration circuitry 108 converts at least a portion of terrestrial signal 114 into a satellite channel frequency, and combines the converted terrestrial signal and satellite signal 112 into an integrated digital signal 116 for delivery to user devices 106 via interface circuitry 110.

Figure 4:
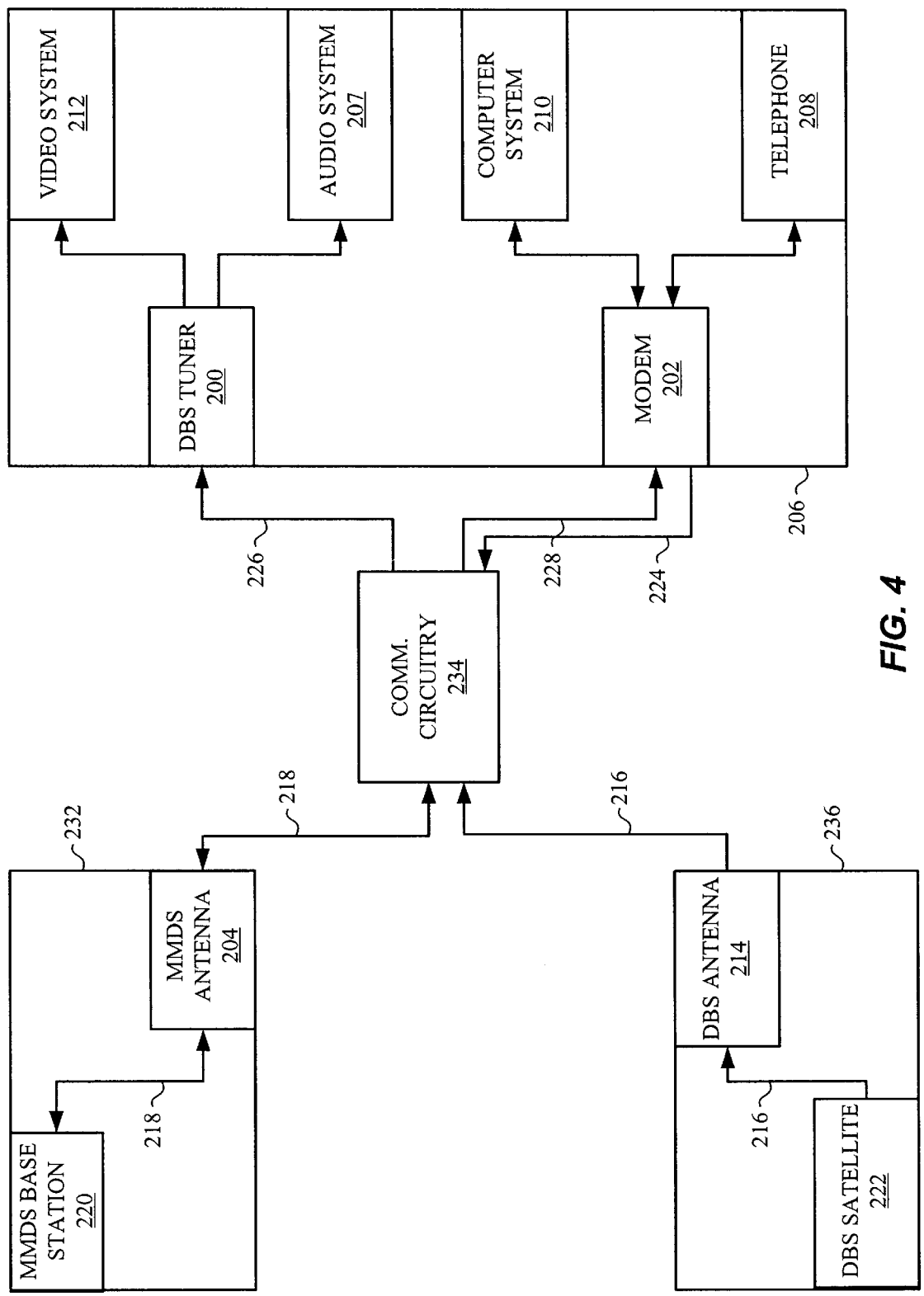
FIG. 4, illustrates a system configuration using DBS and MMDS in an example of the invention.
Figure 5:
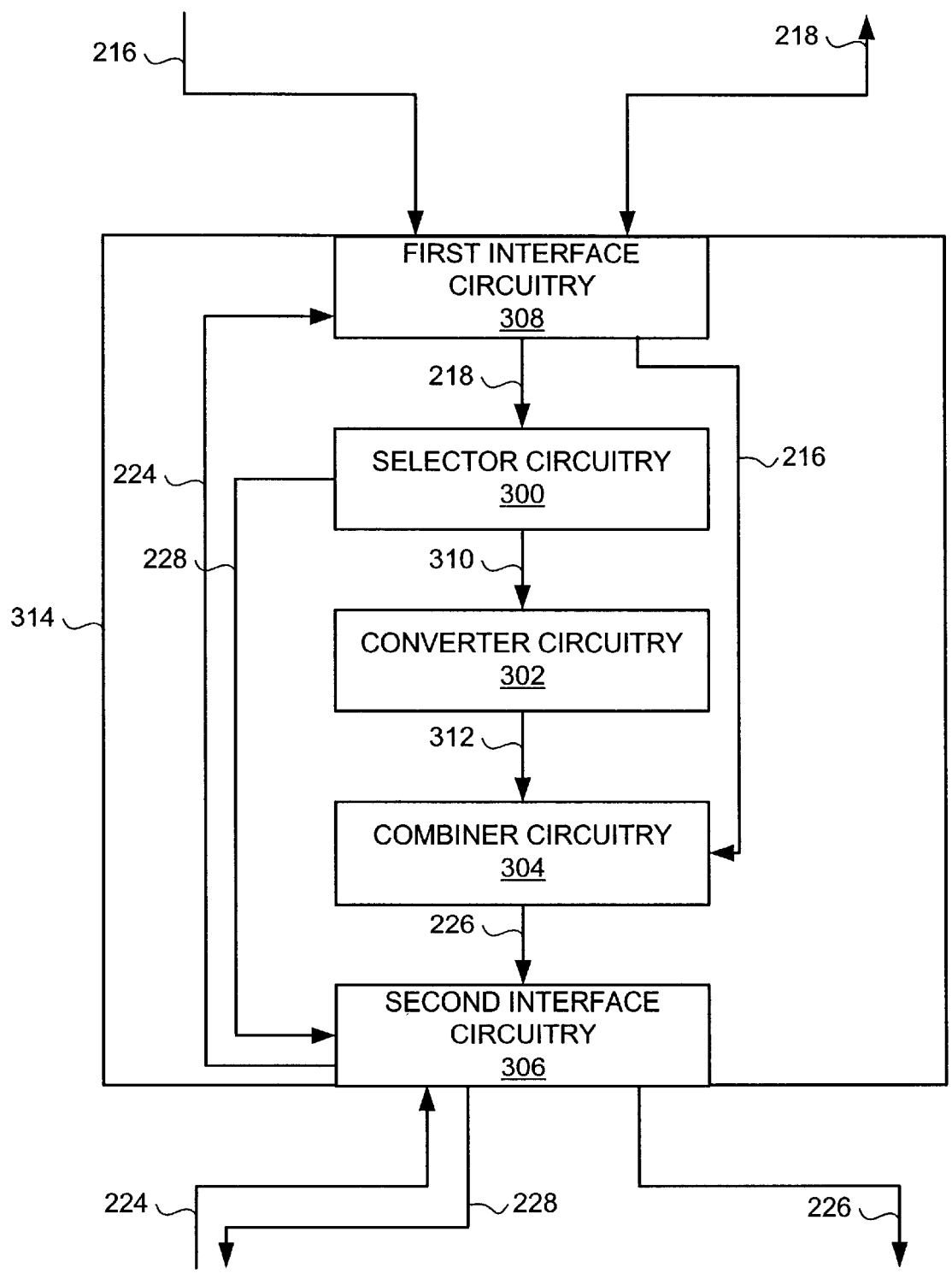
FIG. 5 illustrates the communication circuitry in an example of the invention.

FIGS. 4–5 illustrate an example of a system configuration for the communications circuitry of the present invention, but those skilled in the art will recognize numerous other configurations that are applicable to the invention described above. Those skilled in the art will also appreciate how combinations of features described below can be combined with the above-described embodiment.

FIG. 4 depicts satellite system 236, terrestrial communications system 232, communications circuitry 234, and user devices 206. Terrestrial communications system 232 comprises MMDS base station 220, MMDS signal 218, and MMDS antenna 204. Satellite system 236 comprises DBS satellite 222, DBS signal 216, and DBS antenna 214. User devices 206 comprise DBS tuner 200, video system 212, audio system 207, modem 202, computer system 210, and telephone 208.

Communications circuitry 234 is connected to MMDS antenna 204, DBS antenna 214, DBS tuner 200, and modem 202. DBS tuner 200 is connected to peripheral devices including but not limited to, video system 212 and audio system 207. Modem 202 is connected to peripheral devices including but not limited to, computer system 210 and telephone 208.

DBS antenna 214 is a conventional DBS dish operative to receive DBS signal 216 from DBS satellite 222. DBS tuner 200 is a conventional DBS tuner operative to receive and deliver a DBS signal to video system 212 and audio system 207. MMDS antenna 204 could be a conventional MMDS dish and down converter operative to exchange MMDS signal 218 with MMDS base station 220. Modem 202 could be any modem operable to exchange voice and data signal arrangements, one example being a cable modem.

In operation, communications circuitry 234 receives DBS signal 216 from DBS antenna 214 and MMDS signal 218 from MMDS antenna 204. MMDS signal 218 may comprise voice signals, video signals, and/or data signals. MMDS signal 218 could be any MMDS signal compatible with DBS system 236. Such compatibility includes, the same data compression, data encryption, digital packet format, synchronization (timing of signals), frequency of RF input to tuner/demodulator of DBS receiver, programming authorization, and billing processes.

DBS signal 216 comprises a video signal. In the context of this invention a video signal includes conventional video and audio signals. An example of DBS signal 216 could be national television broadcasting. An example of MMDS signal 218 could be local television broadcasting not carried by DBS signal 216, a voice signal, an Internet signal, a data signal, a fax transmission, or various combinations of the above signals.

Communications circuitry 234 separates voice and data signals 228 from video signals within MMDS signal 218. Separated voice and data signals 228 are transmitted to cable modem 202 for delivery to computer system 210 and telephone 208. The remaining MMDS video signal is converted to a direct broadcast satellite channel frequency. The converted MMDS signal and DBS signal 216 are combined into an integrated digital signal 226 so that the converted signal occupies spare channels in DBS signal 216. The integrated digital signal 226 is provided to DBS tuner 200 for delivery to video system 212 and audio system 207. Communications circuitry 234 also receives user output voice and data signals 224 from modem 202, and transmits user output signals 224 via MMDS antenna 204.

FIG. 5 illustrates the configuration of communications circuitry 314. Those skilled in the art will appreciate that communications circuitry 314 is circuitry and may be configured to stand alone or be incorporated into various devices, including but not limited to, DBS tuner 200, modem 202, or both. In addition, those skilled in the art will appreciate that as circuitry, various configurations can be arranged that perform the operations of the present invention, and thus, the detailed example described below is for purpose of illustration and not limitation.

FIG. 5 depicts communications circuitry 314, MMDS signal 218, DBS signal 216, integrated digital signal 226, incoming voice and data signal 228, and user output communication signal 224. Communications circuitry 314 is comprised of first interface circuitry 308, selector circuitry 300, converter circuitry 302, combiner circuitry 304, and second interface circuitry 306. First interface circuitry 308 is connected to selector circuitry 300, combiner circuitry 304, and second interface circuitry 306. Selector circuitry 300 is connected to converter circuitry 302, and second interface circuitry 306. Converter circuitry 302 is connected to combiner circuitry 304, which is connected to second interface circuitry 306.

First interface circuitry 308 could be any circuitry configured to exchange MMDS signal 218 with MMDS antenna 204 and receive DBS signal 216 from DBS antenna 214. First interface circuitry 308 provides MMDS signal 218 to selector circuitry 300 and provides DBS signal 216 to combiner circuitry 304. Based on a signal arrangement provided for in the MMDS frequency allocation, selector circuitry 300 separates voice and data signal 228 from MMDS signal 218 and transmits voice and data signal 228 to second interface circuitry 306. Second interface circuitry 306 provides voice and data signal 228 to modem 202 for delivery to computer system 210 and telephone 208. Second interface circuitry 306 also delivers user output voice and data signal 224 from modem 202 to first interface circuitry 308 for transmission over terrestrial communications system 232.

The remaining MMDS video signal 310 is transmitted to converter circuitry 302. Converter circuitry 302 is a frequency converter configured to convert MMDS video signal 310 into direct broadcast satellite channel frequency 312. For example, converter circuitry 302 converts MMDS video signal 310 to replicate the down converted 950 to 1450 Mhz range signal required by DBS tuner 200. Converter circuitry 302 transmits converted MMDS signal 312 to combiner circuitry 304.

Combiner circuitry 304 receives DBS signal 216 from first interface circuitry 308 and receives converted MMDS signal 312 from converter circuitry 302. Combiner circuitry 304 combines converted MMDS signal 312 and DBS signal 216 into a unified integrated digital signal 226. In integrated digital signal 226, MMDS signal 312 occupies spare channels of DBS signal 216. Combiner circuitry 304 delivers integrated digital signal 226 to second interface circuitry 306. Second interface circuitry 306 delivers integrated digital signal 226 to DBS tuner 200 for distribution over DBS channels to video system 212 and audio system 207.

Advantageously, video programming from a DBS system and programming from a Terrestrial Broadband Network are integrated into the DBS tuner for seamless program selection by the end user without switching between sources. Those skilled in the art will appreciate variations of the above-described embodiments that fall within the scope of the invention. As a result, the invention is not limited to the specific examples and illustrations discussed above, but only by the following claims and their equivalents.

I claim:

1. Communications circuitry comprising:
   interface circuitry configured to receive a satellite signal having a frequency in a satellite frequency band, to receive a terrestrial signal having a frequency outside of the satellite frequency band, and to transfer the satellite signal and the terrestrial signal; and
   integration circuitry comprising:
   selector circuitry configured to separate a voice signal and a video signal from the terrestrial signal,
   converter circuitry configured to convert the video signal to a converted video signal having a frequency in the satellite frequency band, and
   combiner circuitry configured to combine the converted video signal with the satellite signal to generate an integrated digital signal;
   wherein the converted terrestrial video signal occupies at least one unoccupied channel in the satellite signal;
   wherein the interface circuitry is further configured to transmit the integrated digital signal.

2. The communications circuitry of claim 1, wherein the terrestrial signal comprises a terrestrial wireless signal.

3. The communications circuitry of claim 1, wherein the terrestrial signal comprises a terrestrial wireline signal.

4. The communications circuitry of claim 1, wherein the terrestrial signal comprises a microwave multi-point distribution signal.

5. The communications circuitry of claim 1,
   wherein the terrestrial signal comprises full duplex communications; and
   wherein the interface circuitry is further configured to transmit the terrestrial signal to a terrestrial communication system.

6. The communications circuitry of claim 1, wherein the terrestrial signal comprises a digital subscriber line signal.

7. The communications circuitry of claim 1, wherein the satellite signal comprises a direct broadcast satellite signal.

8. The communications circuitry of claim 1, wherein the interface circuitry comprises:
   a satellite antenna configured to receive the satellite signal from a satellite communication system; and a non-satellite antenna configured to receive the terrestrial signal from a terrestrial communication system.

9. The communications circuitry of claim 1, wherein the interface circuitry is further configured to deliver the integrated digital signal to at least one user device.

10. The communications circuitry of claim 1, wherein the selector circuitry is configured to deliver the separated voice signal to the interface circuitry.

11. The communications circuitry of claim 1, wherein the sector circuitry is configured to separate a data signal and the video signal from the terrestrial signal.

12. The communications circuitry of claim 11, wherein the sector circuitry is configured to deliver the separate data signal to the interface circuitry.

13. The communications circuitry of claim 1, wherein the sector circuitry is configured to separate a voice signal, a data signal, and the video signal from the terrestrial signal.

14. The communications circuitry of claim 13, wherein the sector circuitry is configured to deliver the separate voice signal data signal to the interface circuitry.

15. A method of operating communication circuitry to integrate a satellite signal from a satellite communication system with a terrestrial signal from a terrestrial communications system, wherein the communication circuitry comprises interface circuitry and integration circuitry, wherein the interface circuitry is located in a near proximity to the integration circuitry, the method comprising:

in the interface circuitry,
receiving the satellite signal having a frequency in a satellite frequency band,
receiving the terrestrial signal having a frequency outside of the satellite frequency band, and
transferring the satellite signal and the terrestrial signal to the integration circuitry; and in the integration circuitry,
separating a voice signal and a video signal from the terrestrial signal;
converting the video signal to a converted video signal having a frequency in a the satellite frequency band,
combining the converted video signal with the satellite signal to generate an integrated digital signal, and
transmitting the integrated digital signal;

wherein the converted video signal occupies at least one unoccupied channel in the satellite signal.

16. The method of claim 15, wherein the satellite signal comprises a direct broadcast satellite signal.

17. The method of claim 15, further comprising:
separating at least one of a voice signal and a data signal from the terrestrial signal; and
providing the separated voice signal and data signal to at least one user device.

18. The method of claim 15, wherein:
receiving the satellite signal in the interface circuitry comprises receiving the satellite signal using a satellite antenna; and
receiving the terrestrial signal in the interface circuitry comprises receiving the terrestrial signal using a non-satellite antenna.

19. The method of claim 15, wherein the terrestrial signal comprises a terrestrial wireline signal.

20. The method of claim 15, wherein the terrestrial signal comprises a full duplex communications; and
wherein the method further comprises transmitting the terrestrial signal to the a terrestrial communication system.

21. The method of claim 19, wherein the terrestrial wireline signal comprises a digital subscriber line signal.

22. The method of claim 15, wherein the terrestrial signal comprises a terrestrial wireless signal.

23. The method of claim 22, wherein the terrestrial wireless signal comprises a microwave multi-point distribution signal.

* * * * *